UNITED STATES PATENT OFFICE.

JOSHUA R. HAYES, OF PHILADELPHIA, PENNSYLVANIA.

IMPROVEMENT IN COMPOSITION PAVEMENTS.

Specification forming part of Letters Patent No. 124,059, dated February 27, 1872; antedated February 17, 1872.

SPECIFICATION.

I, JOSHUA R. HAYES, of Philadelphia, in the county of Philadelphia and State of Pennsylvania, have invented certain Improvements in Making Pavements, &c., of which the following is a specification:

To make artificial stone or flagging by the use of hydraulic cement it is customary to mix the cement with a definite quantity of sand or gravel in order to obtain the maximum degree of strength and durability. When used in this way for pavements, &c., the process necessitates a body in thickness equal to the office for which it is designed, which, in the case of the most durable cements, as the Portland, Roman, &c., when they are used for the purpose, involves much expense. To obviate this outlay in a great measure is the object of my invention.

As a foundation upon which to place the Portland or other cement the requisite degree of thickness necessary for the purpose, I lay down a layer of artificial asphalt made in accordance with specifications in Letters Patent heretofore issued to me by the United States, and numbered, respectively, 107,489 and 107,490. This foundation, as soon as it is cool, is ready to receive its layer, composed of the following ingredients and in about the following proportions: Portland or other suitable cement, two and one-half parts; sharp sand, clean from sediment, two and one-half parts; marl, washed, one part. These ingredients, thoroughly mixed together before the minimum quantity of water is applied, are made into a mortar and applied to the surface of the asphalt foundation the required thickness for the purpose. For sidewalks and many other purposes this thickness need not exceed one-fourth of an inch. The asphalt foundation (in itself a solid pavement when properly prepared and laid) makes a firm basis upon which to lay the cement mortar, and being impervious to water and exempt from the alternations of heat and cold, the cement is not so liable to crack and disintegrate, as is usually the case where the foundation is béton or ordinary concrete. Any asphaltic compound composed of sand, tar, pitch, &c., may be used for this foundation; but I prefer for this purpose the artificial asphalt made in accordance with Letters Patent before mentioned.

The use of marl as a part of the sand in making the cement-mortar I find answers a treble purpose: first, the crystals of sand in marl are finely divided, and hence more compactness is the result when the mortar has set; secondly, the lime in marl, in combination with oxide of iron, found also in marl, is hydraulic, and thereby adds to the strength; and thirdly, a green, blue, red, or maroon color is obtained, pleasant to the eye.

In addition to walks, pavements, &c., constructed of this combination of asphalt and cement, water and other pipes may be cast possessing great strength and durability.

In making walks, pavements, &c., in the manner I have described, grooves are made in the mortar cement, with a trowel or other suitable implement, down to the asphalt foundation, and at suitable intervals, to give the appearance of flags, and to obviate, under any circumstances, cracking under the influence of the elements.

I claim as my invention—

1. The combination of hydraulic cement with an asphaltic foundation, to form pavements, pipes, and for other similar purposes, in the manner substantially as described.

2. The use of marl in combination with any hydraulic cement, and this again with any asphaltic basis, in the manner and for the purposes substantially as described.

J. R. HAYES, M. D.

Witnesses:
ISAAC P. WENDELL,
THOMAS J. BEWLEY.